(12) United States Patent
Daigle et al.

(10) Patent No.: US 7,535,116 B2
(45) Date of Patent: May 19, 2009

(54) SYSTEM AND METHOD FOR CONTROLLING AN OUTPUT OF AN AUXILIARY POWER SOURCE OF A DIESEL POWERED SYSTEM

(75) Inventors: Jeffrey Louis Daigle, Erie, PA (US); Ajith Kuttannair Kumar, Erie, PA (US); Bret Dwayne Worden, Union City, PA (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 11/735,620

(22) Filed: Apr. 16, 2007

(65) Prior Publication Data

US 2008/0252182 A1 Oct. 16, 2008

(51) Int. Cl.
  *H02P 9/04* (2006.01)
(52) U.S. Cl. .................. 290/40 C; 290/40 A; 322/29
(58) Field of Classification Search ............... 290/1 A, 290/4 R, 40 R, 40 A, 40 C, 51; 322/17, 29, 322/37
  See application file for complete search history.

(56) References Cited

U.S. PATENT DOCUMENTS

| | | | |
|---|---|---|---|
| 3,524,069 A | 8/1970 | Dmitrievich et al. | |
| 4,246,531 A * | 1/1981 | Jordan | 322/28 |
| 4,472,673 A * | 9/1984 | Miller | 322/32 |
| 4,510,433 A * | 4/1985 | Gamze et al. | 322/32 |
| 4,625,160 A * | 11/1986 | Hucker | 322/32 |
| 5,068,591 A * | 11/1991 | Hoegberg et al. | 322/29 |
| 5,998,880 A * | 12/1999 | Kumar | 290/40 B |
| 6,049,196 A * | 4/2000 | Arai et al. | 322/61 |
| 6,486,568 B1 | 11/2002 | King et al. | |
| 6,586,914 B2 | 7/2003 | Garrigan et al. | |
| 6,859,018 B2 | 2/2005 | Garrigan et al. | |
| 6,870,350 B2 | 3/2005 | Garrigan et al. | |
| 7,064,455 B2 * | 6/2006 | Lando | 290/1 C |
| 2005/0183623 A1 | 8/2005 | Gritsch | |
| 2006/0119177 A1 | 6/2006 | Kumar et al. | |

FOREIGN PATENT DOCUMENTS

| | | |
|---|---|---|
| EP | 0 817 367 | 1/1998 |
| EP | 1 104 091 | 5/2001 |
| EP | 1 229 636 | 8/2002 |
| GB | 2 276 022 | 9/1994 |

* cited by examiner

*Primary Examiner*—Nicholas Ponomarenko
(74) *Attorney, Agent, or Firm*—Robert Wawrzyn, Esq.; Terry M. Sanks, Esq.; Beusse Wolter Sanks Mora & Maire, P.A.

(57) ABSTRACT

A system and method for controlling a power output of an auxiliary alternator of a diesel powered system having at least one diesel-fueled power generating unit, the alternator powering at least one dynamoelectric device of the diesel powered system. The system includes an alternator coupled to the diesel-fueled power generating unit having a wound rotor for supplying electrical power to at least one dynamoelectric device of the diesel powered system. The system also includes a controller for determining a desired operating frequency of the dynamoelectric device and providing a control signal for producing the desired operating frequency. The system further includes a regulator for providing a rotor control output responsive to the control signal to control an electrical condition of the rotor for adjusting the electrical power supplied to the dynamoelectric device effective to produce the desired operating frequency.

37 Claims, 2 Drawing Sheets

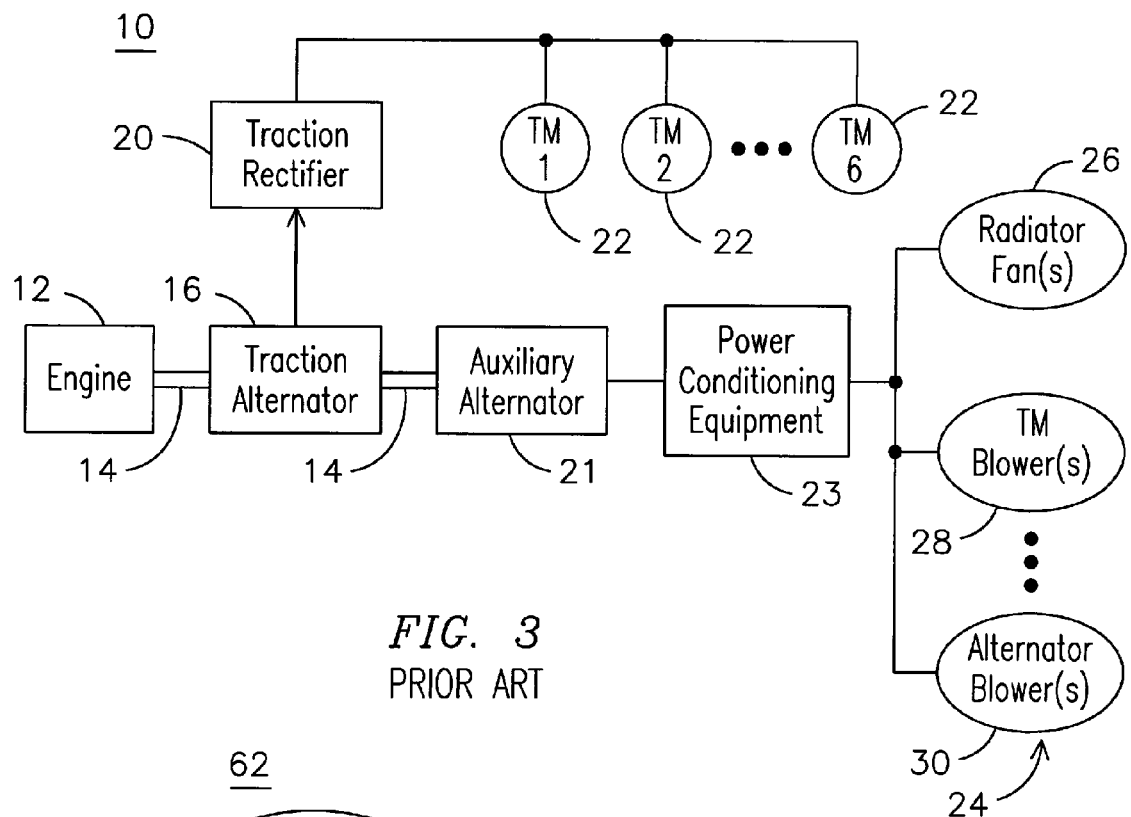
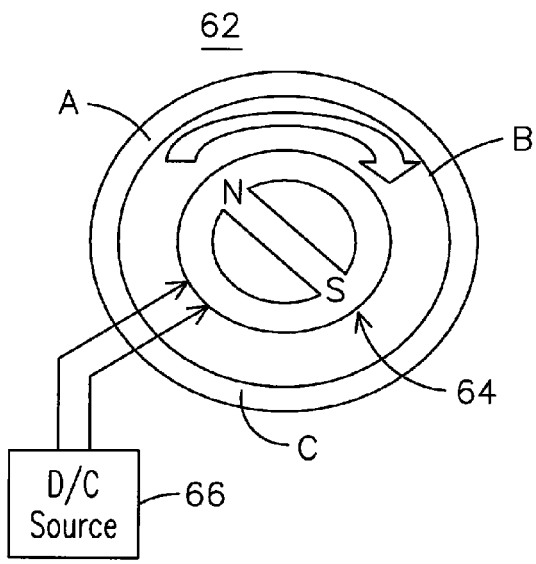
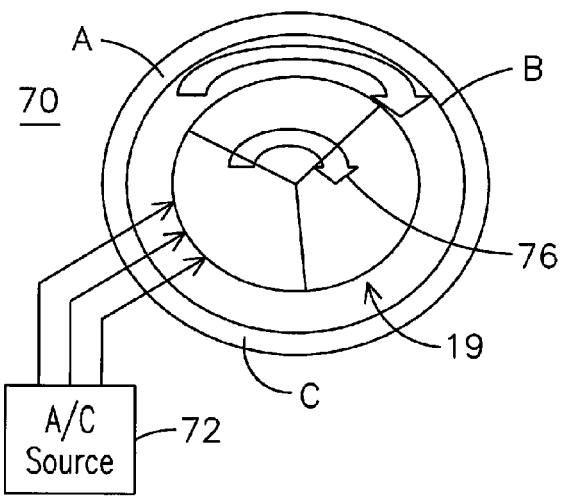
FIG. 3
PRIOR ART
FIG. 4
FIG. 5

SYSTEM AND METHOD FOR CONTROLLING AN OUTPUT OF AN AUXILIARY POWER SOURCE OF A DIESEL POWERED SYSTEM

FIELD OF THE INVENTION

This invention relates to a diesel powered system, such as a train, off highway vehicle, marine and/or stationary diesel powered system and, more particularly, to controlling an output of an auxiliary power source of a diesel powered system.

BACKGROUND OF THE INVENTION

Diesel powered systems such as, but not limited to, off-highway vehicles, marine diesel powered propulsion plants, stationary diesel powered system and rail vehicle systems, or trains, usually are powered by a diesel power unit. With respect to rail vehicle systems, the diesel power unit is part of at least one locomotive and the train further includes a plurality of rail cars, such as freight cars. Locomotives are complex systems with numerous subsystems, with each subsystem being interdependent on other subsystems.

A diesel-electric locomotive typically includes a diesel engine coupled to drive electrical power sources including a main alternator and an auxiliary alternator, each alternator producing alternating current (AC) electrical power. Such alternators are typically salient pole, synchronous dynamoelectric machines. The main alternator may be coupled to power one or more traction motors, and the auxiliary alternator may be coupled to power locomotive auxiliary electrical equipment. A frequency of an AC output of the alternators is proportional to engine speed in revolutions per minute (RPM). For example, at a typical locomotive engine speed of 1050 RPM, an AC output of 105 Hertz is produced for a 12 pole alternator. Some auxiliary equipment, such as fans or blowers used for cooling, may need to be operated at frequencies different than a frequency provided by the auxiliary alternator at normal engine speeds to achieve a desired cooling effect and/or to achieve a better fuel efficiency. In the past, cycle skippers have been used to provide discrete levels of power at certain fixed frequency multiples based on power phases of the supplied AC power. Such solutions typically require additional equipment in the form of cycle skippers that add to the expense and maintenance of the locomotive auxiliary power systems. Alternatively, a frequency of AC power produced by the auxiliary alternator may be varied by adjusting an engine speed to achieve a desired power frequency. However, varying the engine speed may not be practical in some applications and may result in increased fuel usage and emission production during periods of increased cooling demand.

Owners and/or operators of locomotives, off-highway vehicles, marine diesel powered propulsion plants, and/or stationary diesel powered systems desire to optimize fuel efficiency and emission output so as to save on overall fuel consumption while minimizing emission output.

BRIEF SUMMARY OF THE INVENTION

In an embodiment, the invention includes a system for controlling a power output of an alternator of a diesel powered system having at least one diesel-fueled power generating unit, the alternator powering at least one dynamoelectric device of the diesel powered system. The system includes an alternator coupled to a diesel-fueled power generating unit of a diesel powered system having a wound rotor for supplying electrical power to at least one dynamoelectric device of the diesel powered system. The system also includes a controller for determining a desired operating frequency of the dynamoelectric device and providing a control signal for producing the desired operating frequency. The system also includes a regulator for providing a rotor control output responsive to the control signal to control an electrical condition of the rotor for adjusting the electrical power supplied to the dynamoelectric device effective to produce the desired operating frequency.

In another embodiment, the invention includes a method for controlling a power output of an alternator of a diesel powered system having at least one diesel-fueled power generating unit, the alternator powering at least one dynamoelectric device of the diesel powered system. The method includes providing an alternator coupled to a diesel-fueled power generating unit of a diesel powered system having a wound rotor, the alternator supplying power to at least one dynamoelectric device of the diesel powered system. The method also includes determining a desired operating frequency of the dynamoelectric device. The method further includes controlling an electrical condition of the rotor for adjusting the electrical power supplied to the dynamoelectric device for producing the desired operating frequency.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which:

FIG. 3 is a block diagram schematic of a prior art locomotive power system;

FIG. 4 is a schematic diagram of an example salient pole synchronous machine; and FIG. 5 is a schematic diagram of an example wound rotor machine.

DETAILED DESCRIPTION OF THE INVENTION

Figure 1:
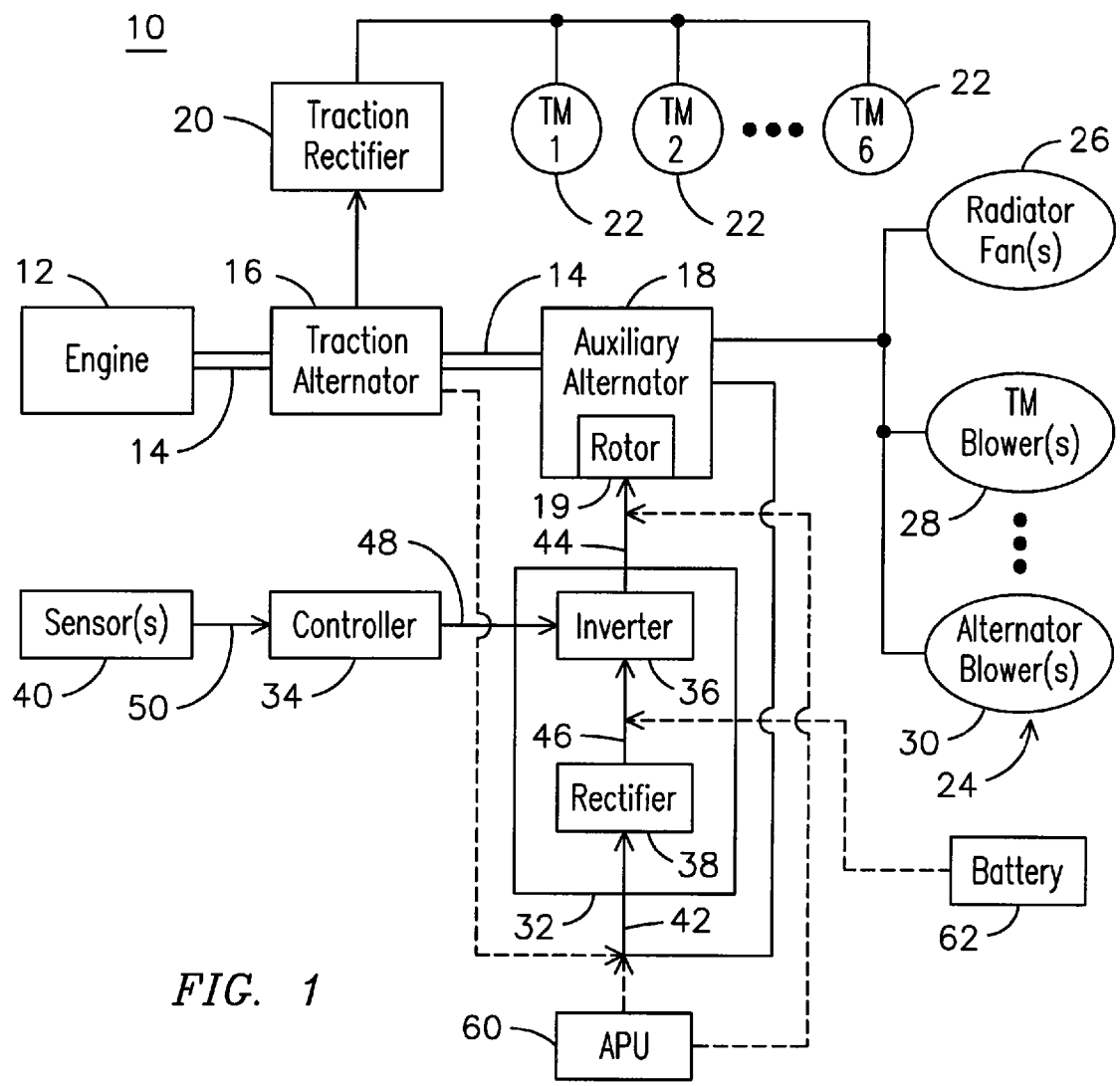
FIG. 1 is a block diagram schematic of an exemplary embodiment of a locomotive power system in accordance with aspects of the present invention.

Reference will now be made in detail to the embodiments consistent with the invention, examples of which are illustrated in the accompanying drawings. Wherever possible, the same reference numerals used throughout the drawings refer to the same or like parts.

Though exemplary embodiments of the present invention are described with respect to rail vehicles, specifically trains and locomotives having diesel engines, exemplary embodiments of the invention are also applicable for other uses, such as but not limited to off-highway vehicles, marine vessels, and stationary units, each which may use a diesel engine. For example, with respect to a stationary power generating station, a plurality of stations may be grouped together collectively generating power for a specific location and/or purpose. In another exemplary embodiment, a single station is provided, but with a plurality of generators making up the single station. Towards this end, when discussing a specified mission, this includes a task or requirement to be performed by the diesel powered system. Therefore, with respect to railway, marine or off-highway vehicle applications this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating condition of the diesel-fueled power generating unit may include one or more of speed, load, fueling value, timing, etc.

In one exemplary example involving marine vessels, a plurality of tugs may be operating together where all are moving the same larger vessel, where each tug is linked in time to accomplish the mission of moving the larger vessel. In another exemplary example a single marine vessel may have a plurality of engines. Off Highway Vehicle (OHV) may involve a fleet of vehicles that have a same mission to move earth, from location A to location B, where each OHV is linked in time to accomplish the mission.

The inventors of the present invention have developed an innovative system for controlling auxiliary power supplied to locomotive auxiliary equipment that at least partially decouples a frequency and/or voltage of the auxiliary power from engine speed. By replacing a salient pole alternator typically used in locomotives with a wound rotor alternator, variable frequency power may be provided by controlling an electrical condition of the rotor, resulting in a corresponding variable frequency and/or voltage produced by the alternator.

FIG. 1 is a block diagram schematic of an exemplary embodiment of a locomotive power system 10 in accordance with aspects of the present invention. This system 10 includes an engine 12 having a shaft 14 coupled to a main, or traction alternator 16 and an auxiliary alternator 18. The traction alternator 16 may be electrically coupled via traction rectifier 20 to one or more traction motors 22. The main alternator 16 and the auxiliary alternator 18, being directly coupled to the engine 12 via the shaft 14, generate AC having a frequency proportional to a speed of the engine 12. Accordingly, the output frequency of the auxiliary alternator 18 is a direct function of the diesel engine speed, such as the revolutions per minute (rpm) of the engine 12.

The auxiliary alternator 18 may be coupled to power auxiliary equipment devices 24 that may include dynamoelectric machines, such as one or more radiator fan motors 26, one or more traction motor blowers 28, and/or one or more alternator blowers 30. In an embodiment, operation of the auxiliary equipment devices 24, such as a rotation speed, and accordingly, a cooling capability and/or the power consumed by auxiliary equipment devices 24, may be dependent on the speed of the engine 12 due to the output frequency of the auxiliary alternator 18 being a direct function of the diesel engine speed.

As shown in the prior art system of FIG. 3, the auxiliary alternator 21 may include a salient pole synchronous machine that requires power conditioning equipment 23, such as one or more cycle skippers, for decoupling a frequency and/or voltage of an input to the auxiliary equipment devices 24 from the engine speed. Although a single set of power conditioning equipment 23 is shown in the FIG. 3, typically there may be multiple power conditioning equipment sets. A power conditioning configurations may include one set of power conditioning equipment such as cycle skippers, contactors, rectifiers, etc., that power one or more auxiliary loads, such as fans and/or blowers. Another power conditioning configuration may include multiple power conversion equipment sets supplying power to an auxiliary load, such as pole changing motors. FIG. 4 shows a schematic diagram of an example salient pole synchronous machine 62. The salient pole synchronous machine 62 may include an armature 64 having permanent magnets or an electromagnetic armature 64 energized by a DC source 66, and driven via the engine shaft 14. Consequently, the salient pole synchronous machine 62 generates AC power at phases A, B, and C having a frequency proportional to a speed of the engine 12. FIG. 5 shows a schematic diagram of an example wound rotor machine 70 that includes a wound rotor 19 powered by an AC source 72. The wound rotor 19 includes spatially distributed windings that produce a magnetic field 76 that turns at a frequency corresponding to the rotor excitation power input, with respect to the wound rotor 19.

Accordingly, by controlling an electrical condition of the wound rotor 19, a power output of the wound rotor machine 70, such as a frequency of the power output at phases A, B, and C, may be controlled independently of rotor rotation speed. By using a wound rotor machine 70 for the alternator 18, a frequency output of the alternator 18 may be varied independently of engine speed by controlling an electrical frequency of the wound rotor 19. Advantageously, engine speed may be raised or lowered without directly affecting a power supplied to auxiliary equipment devices 24. For example, engine speed may be lowered to consume less fuel while still providing a desired amount of cooling produced by one or more auxiliary equipment devices 24 that previously would have required a relatively higher engine speed. In another aspect, engine speed may be maintained while reducing the power supplied to the auxiliary equipment devices 24 to consume less electrical energy. Accordingly, the engine 12 may be run at an optimum speed to achieve a desired engine operating condition, such as fuel efficiency, traction level, noise, desired engine emission, minimum engine horsepower, failure mode condition etc., while allowing the auxiliary equipment devices 24 to be run at speeds decoupled from the engine speed. In various example embodiments, the wound rotor auxiliary alternator 18 may include a single winding alternator, a multiple winding alternator, such as a doubly wound alternator, a delta wound alternator, a wye wound alternator, and/or a pole switching alternator. Thus, an amplitude and frequency of the alternator output voltage can be controlled by an amplitude and frequency of the excitation supplied to the rotor.

The system 10 may include a regulator 32, such as an AC power source on board the locomotive, for controlling a rotor electrical condition. In one example embodiment, the regulator 32 may be embodied by an auxiliary power unit (APU) 60 generating a rotor control output 44 for controlling the rotor electrical condition. In another example embodiment, the regulator 32 may be configured for receiving at least a portion 42 of the power supplied by the alternator 18, or another AC power source of the locomotive, such as the traction alternator 16 or the APU 60, and providing the rotor control output 44. The rotor control output 44 may be used for controlling an electrical condition of the rotor 19 to adjust the electrical power supplied to the auxiliary equipment device(s) 24 effective to produce a desired operating condition, such as an operating frequency of the auxiliary equipment device(s) 24. For example, the regulator 32 may be configured to control at least one of a frequency of electrical power in the rotor 19, a current of electrical power in the rotor 19, and a voltage of electrical power in the rotor 19. Unlike cycle skippers, or cyclo-converters that may have been used in the past to provide discrete levels of auxiliary operating AC frequency, the regulator 32, or other control means, by controlling the rotor electrical condition, allows continually variable speed control of a speed sensitive device 24, such as a radiator fan 26, powered by the alternator 18. For example, when less cooling from a radiator fan 26 is needed, a frequency produced by the alternator 18 (and a corresponding fan speed) may be regulated to be reduced. Conversely, when more cooling is need, a frequency produced by the alternator 18 may be regulated to be increased.

In an embodiment, the regulator 32 may include a rectifier 38 receiving the portion 42 of the power supplied by the auxiliary alternator 18, or another AC power source of the locomotive, such as the traction alternator 16 or the APU 60, and producing a rectified, or direct current (DC) output 46. In various example embodiments, the rectifier 38 may include a full wave rectifier, a half wave rectifier, a single phase rectifier, a multiphase rectifier, and/or a phase controlled rectifier.

The regulator 32 may also include an inverter 36, such as a polyphase DC to AC converter, receiving the DC output 46 and producing the rotor control output 44. In an embodiment, the inverter 36 converts the DC voltage to an appropriate AC voltage having a desired frequency for controlling the rotor electrical condition to drive the auxiliary equipment devices 24 at a desired frequency. In another example embodiment, the DC output 46 may be provided by a DC source on board the locomotive, such as one or more batteries 62.

In an example embodiment, the inverter 36 may include a three-phase inverter for controlling the electrical condition of the rotor to produce a nominal frequency output. Under conditions when an auxiliary equipment device 24 needs to generate more cooling capacity than can be provided at a nominal frequency, the inverter 36 may be controlled to generate an alternating current output for increasing rotor frequency above the nominal frequency, thereby increasing a rotational speed of the auxiliary equipment device 24. When less cooling is desired, the inverter 36 may be controlled to generate an alternating current output for opposing rotor rotation, thereby decreasing a rotational speed of the auxiliary equipment device 24. In various example embodiments, the inverter 36 may include a polyphase inverter, a step inverter, and/or a pulse width modulated inverter.

In an aspect of the invention, the inverter 36 may be controlled by a controller 34. The controller 34 may provide a control signal 48 for controlling the inverter 36 to generate a desired rotor control signal 44 for controlling the rotor electrical condition. For example, the controller 34 may generate a control signal 44 for controlling the inverter 36 to vary the frequency of AC power supplied to a radiator fan motor 26 to achieve a desired fan rotation speed for cooling. The controller 34 may be coupled to one or more sensors 40 for sensing an operating condition of the locomotive. For example, the sensor 40 may include a temperature sensor associated with cooling equipment, such as a radiator, for providing a sensing signal 50 indicative of a temperature condition of the equipment. In another example embodiment, the sensor 40 may be coupled to the inverter 44 for monitoring an inverter frequency and/or voltage. Based on the sensing signal 50, the controller 34 may be configured to provide the control signal 48 to the regulator 32 for controlling the auxiliary equipment devices 24, such as a fan speed of the radiator fan 26, according to a sensed condition being different from a desired condition. For example, when a temperature of radiator coolant rises as indicated by sensing signal 50, the controller 34 may be configured to control the regulator 32 to increase a speed of the appropriate radiator fan 26 to provide additional cooling.

In an embodiment of the invention, the rotor 19 of the alternator 18 may include fewer poles than prior art alternators used in association with diesel powered system. For example, a conventional auxiliary alternator of a locomotive may include a 12 pole rotor. In an aspect of the invention, a wound rotor alternator having 10 poles may be used, thereby reducing the base frequency of the alternator 18 compared to the conventional 12 pole rotor. Even though the wound rotor 19 may be excited such that the alternator's output frequency may be adjusted above and below a conventional 12 pole rotor frequency (wherein the horsepower load of typical blowers 28, 30 and fans 26 may be most effectively modified) an alternator having 10 poles provides a wider range of frequency reduction control of an auxiliary load when using a lower range of frequency for controlling a condition of a wound rotor. For example, a 0% to 20% input frequency range into the wound rotor provides a range of frequency output 0.8 to 1.2 times the engine frequency. Because the alternator poles have been reduced from 12 to 10, the effective frequency range may extend from 0.66 to 1.0 times the frequency output of the 12 pole alternator case. Thus, a 10 pole wound rotor alternator provides a means of shifting the output frequency range compared to a conventional 12 pole alternator. It should be understood that the invention is not limited to a 10 pole alternator but may include pole configurations less that or more than 12 poles. In an additional aspect of the invention, an engine power requirement for operating the alternator 18 may be reduced by a factor of $(10/12)^3$ or other factors.

Figure 2:
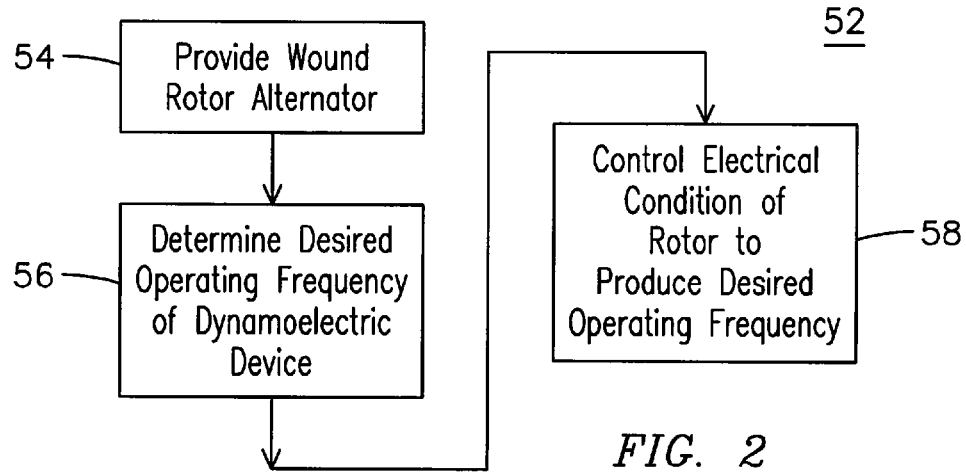
FIG. 2 is a flow diagram for an exemplary embodiment of a method for controlling a power output of an auxiliary power system of a locomotive in accordance with aspects of the present invention.

FIG. 2 is a flow diagram 52 for an exemplary embodiment of a method for controlling a power output of the auxiliary power system of FIG. 1. In certain situations, for reasons of computational efficiency or ease of maintenance, the ordering of the blocks of the illustrated flow chart could be rearranged or moved inside or outside of the illustrated loops by one skilled in the art. The method may include providing a wound rotor alternator 54 coupled to an internal combustion engine of the locomotive, the alternator supplying power to at least one dynamoelectric device of the locomotive. The method may also include determining a desired operating frequency of the dynamoelectric device 56 and then controlling an electrical condition of the rotor for adjusting the electrical power supplied to the dynamoelectric device for producing the desired operating frequency 58. Although not shown as specific blocks on FIG. 2, the method may further include rectifying at least a portion of the power supplied by the alternator to produce a direct current signal. Rectifying may include at least one of full wave rectifying and phase controlled rectifying. The method may also include inverting the direct current signal to generate an alternating current signal, for example, using at least one of stepwise inversion and pulse width modulated inversion. The method may also include using the alternating current signal to control the electrical condition of the rotor, such as by adjusting the alternating current signal responsive to a desired control the electrical condition of the rotor. In an aspect of the invention, adjusting the electrical power supplied to the dynamoelectric device may include adjusting a frequency of the electrical power.

While exemplary embodiments of the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for controlling a power output of an alternator of a diesel powered system having at least one diesel-fueled power generating unit, the alternator powering at least one dynamoelectric device of the diesel powered system, the system for controlling the power output comprising:
    an alternator coupled to a diesel-fueled power generating unit of a diesel powered system having a wound rotor for supplying electrical power to at least one dynamoelectric device of the diesel powered system;
    a controller for determining a desired operating frequency of the dynamoelectric device and providing a control signal for producing the desired operating frequency; and
    a regulator for providing a rotor control output responsive to the control signal to control an electrical condition of the rotor for adjusting the electrical power supplied to the dynamoelectric device effective to produce the desired operating frequency.

2. The system of claim 1, wherein the regulator comprises an alternating current power source of the diesel powered system.

3. The system of claim 1, wherein the regulator comprises an auxiliary power unit.

4. The system of claim 1, wherein the regulator is configured for receiving at least a portion of power supplied by a power source of the diesel powered system.

5. The system of claim 2, wherein the power source comprises at least one of an auxiliary alternator, a traction alternator, an auxiliary power unit, and a battery.

6. The system of claim 1, wherein the regulator comprises a rectifier for receiving at least a portion of the electrical power supplied by the alternator and producing a rectified output.

7. The system of claim 6, wherein the rectifier comprises at least one of a full wave rectifier, a half wave rectifier, a single phase rectifier, a multiphase rectifier, and a phase controlled rectifier.

8. The system of claim 6, wherein the regulator further comprises an inverter for receiving the rectified output and producing the rotor control output responsive to the control signal.

9. The system of claim 8, wherein the inverter comprises at least one of a polyphase inverter, a step inverter, and a pulse width modulated inverter.

10. The system of claim 1, wherein the regulator comprises an inverter for receiving a direct current input from a direct current power source of the diesel powered system.

11. The system of claim 10, wherein the direct current power source comprises a battery.

12. The system of claim 1, wherein the dynamoelectric machine comprises a motor.

13. The system of claim 1, wherein the electrical condition of the rotor comprises at least one of a frequency of electrical power in the rotor, a current of electrical power in the rotor, and a voltage of electrical power in the rotor.

14. The system of claim 1, further comprising a sensor for providing a sensing signal indicative of an operating condition of the locomotive to the controller.

15. The system of claim 14, wherein the controller is further configured for determining a desired operating condition responsive to the sensing signal.

16. The system of claim 1, wherein the controller is further configured for determining a desired operating condition of the dynamoelectric device responsive to at least one of a desired fuel efficiency, a desired engine emission, desired minimum engine horsepower, a failure mode condition, an inverter frequency, and an inverter voltage.

17. The system of claim 1, wherein the alternator comprises at least one of a singly wound alternator, a multiple wound alternator, a delta wound alternator, a wye wound alternator, and a pole switching alternator.

18. The system of claim 1, wherein the diesel powered system comprises a railway transportation system, and wherein the diesel-fueled power generating unit comprises at least one locomotive powered by at least one diesel internal combustion engine.

19. The system of claim 1, wherein the diesel powered system comprises a marine vessel, and wherein the diesel-fueled power generating unit comprises at least one diesel internal combustion engine.

20. The system of claim 1, wherein the diesel powered system comprises an off-highway vehicle, and wherein the diesel-fueled power generating unit comprises at least one diesel internal combustion engine.

21. The system of claim 1, wherein the diesel powered system comprises a stationary power generating station, and wherein the diesel-fueled power generating unit comprises at least one diesel internal combustion engine.

22. The system of claim 1, wherein the diesel powered system comprises a network of stationary power generating stations, and wherein the diesel-fueled power generating unit comprises at least one diesel internal combustion engine.

23. A method for controlling a power output of an alternator of a diesel powered system having at least one diesel-fueled power generating unit, the alternator powering at least one dynamoelectric device of the diesel powered system, the method for controlling the power output comprising:
    providing an alternator coupled to a diesel-fueled power generating unit of a diesel powered system having a wound rotor, the alternator supplying power to at least one dynamoelectric device of the diesel powered system;
    determining a desired operating frequency of the dynamoelectric device; and
    controlling an electrical condition of the rotor for adjusting the electrical power supplied to the dynamoelectric device for producing the desired operating frequency.

24. The method of claim 23, further comprising rectifying at least a portion of the power supplied by an alternating current source of the diesel powered system to produce a direct current signal.

25. The method of claim 24, wherein the alternating current source comprises at least one of an auxiliary alternator, a traction alternator, and an auxiliary power unit.

26. The method of claim 24, wherein rectifying comprises at least one of full wave rectifying and phase controlled rectifying.

27. The method of claim 24, further comprising inverting the direct current signal to generate an alternating current signal.

28. The method of claim 27, wherein inverting comprises at least one of polyphase inversion, stepwise inversion, and pulse width modulated inversion.

29. The method of claim 27, further comprising using the alternating current signal to control the electrical condition of the rotor.

30. The method of claim 23, further comprising using an output from an alternating current source of the diesel powered system to control the electrical condition of the rotor.

31. The method of claim 29, further comprising adjusting the alternating current signal responsive to a desired operating frequency.

32. The method of claim 23, wherein the alternator comprises at least one of a singly wound alternator, a multiple wound alternator, a delta wound alternator, a wye wound alternator, and a pole switching alternator.

33. The method according to claim 23, wherein the diesel powered system comprises a railway transportation system, and wherein the diesel-fueled power generating unit comprises at least one locomotive powered by at least one diesel internal combustion engine.

34. The method according to claim 23, wherein the diesel powered system comprises a marine vessel, and wherein the diesel-fueled power generating unit comprises at least one diesel internal combustion engine.

35. The method according to claim 23, wherein the diesel powered system comprises an off-highway vehicle, and wherein the diesel-fueled power generating unit comprises at least one diesel internal combustion engine.

36. The method according to claim 23, wherein the diesel powered system comprises a stationary power generating station, and wherein the diesel-fueled power generating unit comprises at least one diesel internal combustion engine.

37. The method according to claim 23, wherein the diesel powered system comprises a network of stationary power generating stations, and wherein the diesel-fueled power generating unit comprises at least one diesel internal combustion engine.

* * * * *